United States Patent
Garing et al.

(10) Patent No.: US 10,118,545 B2
(45) Date of Patent: Nov. 6, 2018

(54) ADAPTIVE LIGHTING SYSTEM FOR AN AIRCRAFT INTERIOR

(71) Applicant: B/E Aerospace, Inc., Wellington, FL (US)

(72) Inventors: Francis Xavier L. Garing, Atlanta, GA (US); Alexander Nicholas Pozzi, Winston-Salem, NC (US)

(73) Assignee: B/E Aerospace, Inc., Winston-Salem, NC (US)

(*) Notice: Subject to any disclaimer, the term of this patent is extended or adjusted under 35 U.S.C. 154(b) by 0 days.

(21) Appl. No.: 15/788,596

(22) Filed: Oct. 19, 2017

(65) Prior Publication Data

US 2018/0281673 A1  Oct. 4, 2018

Related U.S. Application Data

(60) Provisional application No. 62/481,532, filed on Apr. 4, 2017.

(51) Int. Cl.
| | |
|---|---|
| *B60Q 3/47* | (2017.01) |
| *B60Q 3/80* | (2017.01) |
| *B60Q 3/43* | (2017.01) |
| *B64D 11/00* | (2006.01) |
| *B64D 47/02* | (2006.01) |

(52) U.S. Cl.
CPC .............. *B60Q 3/47* (2017.02); *B60Q 3/43* (2017.02); *B60Q 3/80* (2017.02); *B64D 11/00* (2013.01); *B64D 47/02* (2013.01); *B64D 2011/0038* (2013.01)

(58) Field of Classification Search
CPC ..... B60Q 3/47; B60Q 3/80; B60Q 3/43; B64D 11/00; B64D 47/02
USPC ........................................... 315/77
See application file for complete search history.

(56) References Cited

U.S. PATENT DOCUMENTS

| | | | |
|---|---|---|---|
| 9,205,914 B1* | 12/2015 | Fagan | B64D 11/0015 |
| 2007/0109802 A1* | 5/2007 | Bryan | B64D 11/00 |
| | | | 362/471 |
| 2008/0266886 A1* | 10/2008 | Wentland | B64D 11/00 |
| | | | 362/470 |

(Continued)

FOREIGN PATENT DOCUMENTS

| | | | | |
|---|---|---|---|---|
| WO | WO 2010036828 A1 * | 4/2010 | | H05B 37/0254 |
| WO | WO 2017173430 A1 * | 10/2017 | | |

*Primary Examiner* — Dylan C White

(74) *Attorney, Agent, or Firm* — Clements Bernard Walker PLLC

(57) ABSTRACT

Systems and methods for adaptively controlling lighting within a passenger suite of an aircraft cabin include a light sensor disposed on or within a surface of a static element of the passenger suite that detects illumination characteristics of external lighting system(s) within the aircraft cabin. The illumination characteristics may include lighting color and intensity. A controller may cause illumination of one or more illumination devices disposed near surfaces of the passenger suite such that the illumination of the surfaces matches or complements the sensed illumination characteristics of the external lighting system(s) independent of any communications received from the external lighting systems, thereby allowing additional ambient lighting systems to be added to the aircraft cabin without having to be integrated with other aircraft lighting systems.

17 Claims, 10 Drawing Sheets

(56) References Cited

U.S. PATENT DOCUMENTS

2013/0208473 A1* 8/2013 Palagashvili .......... B64D 11/00
                                                    362/246
2013/0248655 A1* 9/2013 Kroll ..................... B64D 11/06
                                                    244/118.6
2016/0347453 A1* 12/2016 Ayyagari ........... B64D 11/0015
2017/0073074 A1* 3/2017 Gagnon ................. B64D 11/00
2017/0073075 A1* 3/2017 Gagnon ............. H05B 37/0227
2017/0259735 A1* 9/2017 Terrier .................... B60Q 3/47
2017/0283086 A1* 10/2017 Garing ............. B64D 11/00155

\* cited by examiner

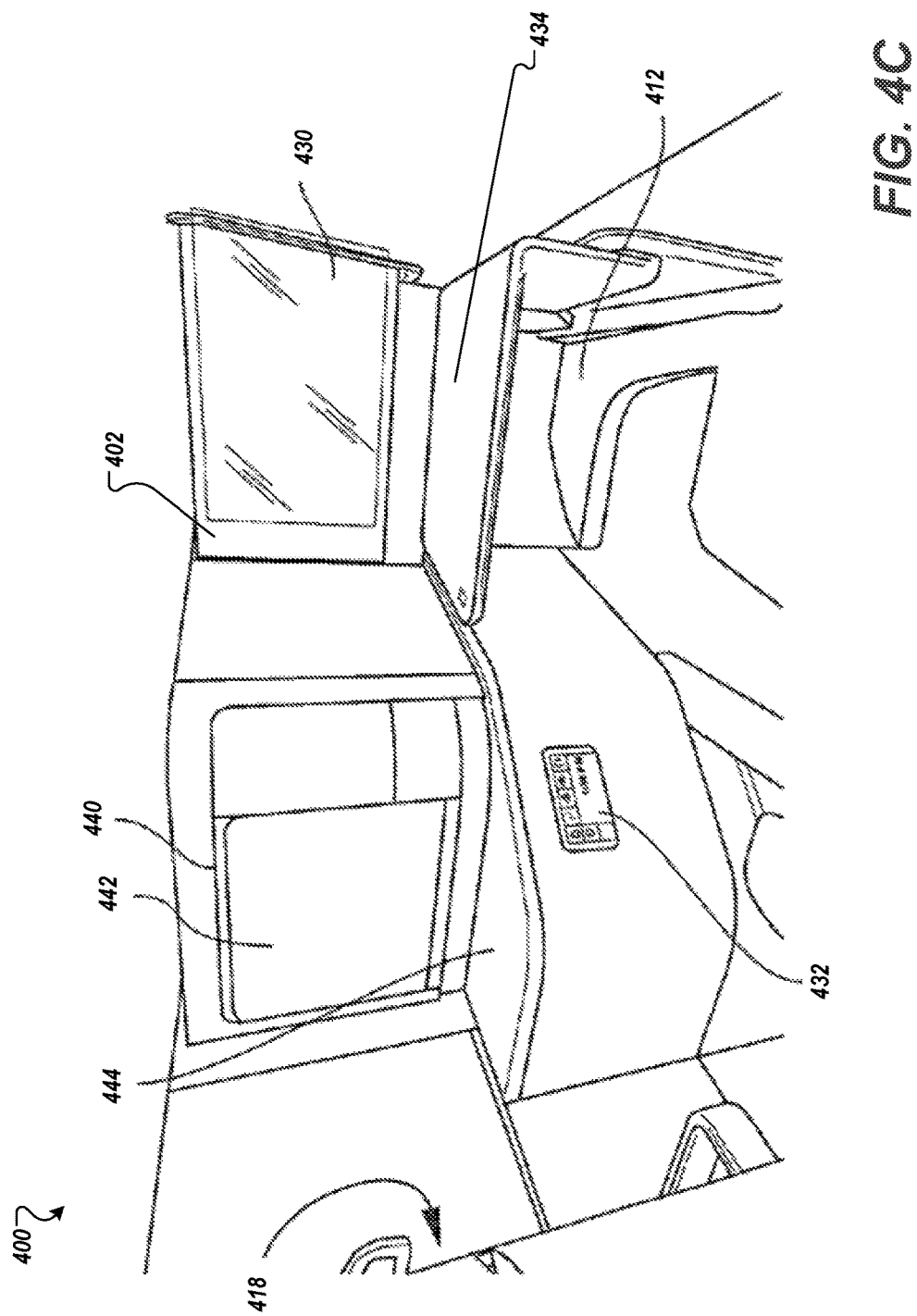

ADAPTIVE LIGHTING SYSTEM FOR AN AIRCRAFT INTERIOR

RELATED APPLICATIONS

This application claims priority to U.S. Provisional Application No. 62/481,532 entitled "Adaptive Lighting System for an Aircraft Interior," and filed Apr. 4, 2017. This application is related to International Patent Application No. PCT/US2013/030794 to B/E Aerospace, Inc. entitled "Aircraft Passenger Suite with Combination Bed" and filed Mar. 13, 2013. All above identified applications are hereby incorporated by reference in their entireties.

BACKGROUND

Aircraft include multiple lighting systems at various locations within an interior of the cabin that perform various functions within the aircraft. For example, the aircraft cabin may include general overhead cabin lighting, overhead reading lights at each seat, lighting for individual passenger suites within premium class (e.g., business class, first class) cabins, aisle or passageway lighting, lavatory lighting, galley lighting, etc. Each type of lighting within the aircraft cabin may be divided into individually controlled lighting systems, but coordinated operations between the individual lighting systems may require communication between the systems via wired or wireless networks that may require complex wiring solutions, complex wireless communication frequency management and messaging protocols, etc. For example, each cabin within the aircraft (e.g., coach, business class, first class, etc.) may have an overhead lighting system that may be individually controlled, but in some situations, the overhead lighting systems for all of the cabins may coordinate with one another to execute a single operation, such as dimming or brightening the overhead lights throughout the entire aircraft.

In addition, some lighting systems within the aircraft are controlled based on the type of lighting applied to other sections of the aircraft. For example, premium class cabin suites may include mood lighting of one or more surfaces within the suite that output light that matches or complements the lighting output by other lighting systems within the aircraft. As the number of lighting systems projecting light into the aircraft cabin increases, modifying the mood lighting within multiple passenger suites based on how other lighting systems in the aircraft are configured becomes more complex due to the inter-system communications that occur to coordinate mood lighting adjustments.

SUMMARY OF ILLUSTRATIVE EMBODIMENTS

In certain embodiments, systems and methods for adaptively controlling ambient lighting within a passenger suite of an aircraft cabin may include a light sensor disposed on or within a surface of a static element of the passenger suite that detects illumination characteristics of external lighting systems within the aircraft cabin. The illumination characteristics may include lighting color and intensity. A controller may cause illumination of devices disposed near surfaces of the passenger suite such that the illumination of the surfaces matches or complements the sensed illumination characteristics of the external lighting systems independently of any communications received from the external lighting systems thereby allowing additional ambient lighting systems to be added to the aircraft cabin without having to be integrated with other aircraft lighting systems.

In some implementations, the ambient lighting systems for each of the passenger suites may be standalone systems that do not communicate electronically with any other lighting systems within the aircraft, making the ambient lighting systems hardware agnostic in the way they interface with other external lighting systems in the aircraft. Because the ambient lighting system is hardware agnostic, compatibility specifications for interfacing with other lighting systems within the aircraft cabin may not be required. In addition, the ambient lighting systems may be implemented on an ad hoc basis without having to be integrated with complex wiring and communication circuitry to other systems, which thereby may reduce the complexity of adding additional ambient lighting systems to the aircraft cabin. Also, due to the lack of need for additional wiring and communications equipment, the weight contribution of the ambient lighting systems within the suites to the overall weight of the aircraft can be reduced.

In certain embodiments, a sensing module for the ambient lighting system may be installed on or proximate surfaces of static elements of the aircraft suite, such as upper surfaces of partitions, panels, or working surfaces within the suite. A location of the light sensor may be determined based at least in part on a relative location of the light sensor to the light entering the suite from the external lighting systems. In some implementations, the static element may include an orifice disposed on an upper surface that provides a path for light to reach a light sensor located within a hollowed-out portion of the static element below the upper surface.

In some implementations, the sensing module may include at least one sensing element disposed on a surface of printed circuit board. In some aspects, the sensing element may be a RGBW color sensor that senses an amount of red, green, blue, and white light from the external lighting systems. The sensing module may include a controller that processes sensor data obtained by the sensing element, determine amounts and colors of light to be output by one or more illumination devices of the ambient lighting system to match and/or complement the sensed illumination characteristics of the external lighting systems, and output control signals to the illumination devices to cause light to be output within the aircraft suite corresponding to the determined illumination characteristics of the illumination devices. In some implementations, the controller may be integrated as part of the sensing module or may be remote from the sensing module connected via a wired or wireless communication network to the sensing module.

In some embodiments, the illumination devices that output light onto the surfaces of the passenger suites may include combinations of colored light emitting diodes (LEDs), LED washlights, infrared (IR) lights, and high-intensity discharge (HID) lights. In some implementations, the illumination devices may include red, green, blue, and white washlights that are configured to output light in various combinations of intensity to represent different colors of light.

In some implementations, an ambient lighting system may include one or more lighting zones within a passenger suite that may include individually controllable illumination devices associated with each of the lighting zones such that the illumination devices for each lighting zone may output light in different colors and amounts of illumination than other zones within the suite. In some aspects, the illumination devices may be configured to output flashing light and/or rotate colors in a predetermined pattern.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 4C illustrates a perspective view of a forward portion of an aircraft passenger suite from a perspective of a seat;

DETAILED DESCRIPTION OF ILLUSTRATIVE EMBODIMENTS

Figure 1:
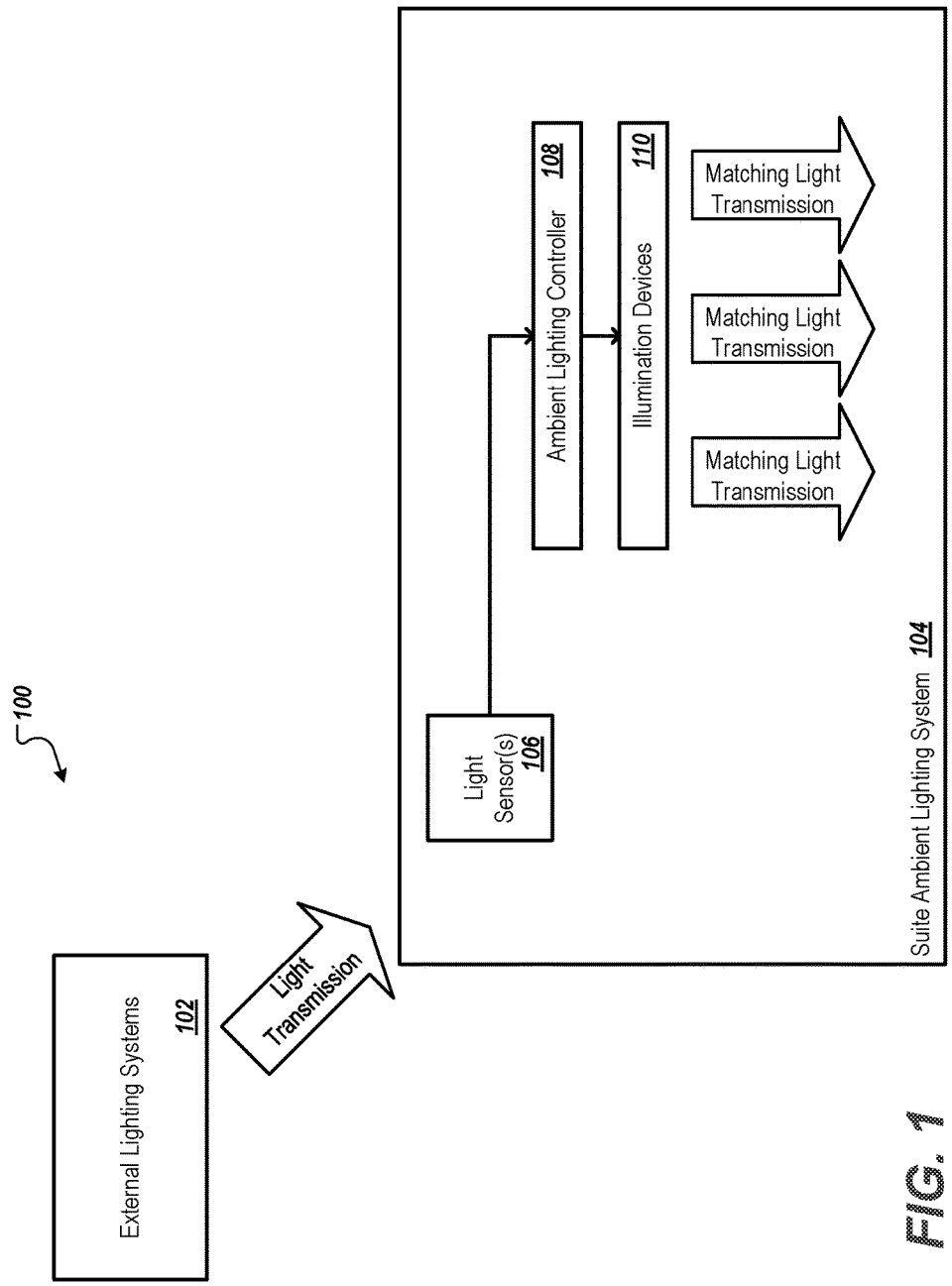
FIG. 1 illustrates a block diagram of an exemplary lighting environment within an aircraft cabin.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Aspects of the present disclosure may be directed to systems and methods for adaptively controlling ambient lighting, also referred to as mood lighting, systems within passenger suites of premium class aircraft cabins. In some implementations, the ambient lighting systems of each passenger suite include multiple panels, surfaces, compartments, or enclosures that are illuminated by lights with various levels of illumination or color schemes to portray a particular environment or mood within the suite based on passenger preferences or sensed characteristics within the aircraft cabin. For example, if a passenger prefers that the suite portray a relaxing mood, the ambient light system may output light onto the surfaces of the suite having colors and levels of illumination that approximate colors that may be known to promote stress reduction and relaxation (e.g., lavender, pale grey, cool blue). In other implementations, the ambient light system may illuminate the suite with light that approximately matches any lighting characteristics within the aircraft cabin.

In some aspects, the ambient lighting system within each individual aircraft suite may be configured to sense the lighting characteristics within the aircraft cabin independently of any communications with control systems associated with other lighting systems within the aircraft. For example, the ambient lighting system may include one or more light sensors disposed within one or more surfaces of a passenger suite that are configured to detect the lighting characteristics within the aircraft cabin, which may include light color and/or amounts of illumination. In some implementations, the ambient lighting systems for each of the passenger suites may be standalone systems that may not communicate with any other lighting systems within the aircraft. In addition, the ambient lighting systems may be implemented on an ad hoc basis without having to be integrated with complex wiring and communication circuitry to other systems, which thereby may reduce the contribution of the ambient lighting systems within the suites to the overall weight of the aircraft.

Turning to the figures, FIG. 1 illustrates a block diagram of an exemplary lighting environment 100 within an aircraft cabin. In some implementations, the lighting environment 100 may include external lighting systems 102 that may include a combination of various lighting systems that may contribute to levels and colors of illumination within the aircraft cabin. For example, the external lighting systems 102 may include any number of overhead cabin lighting systems, overhead reading lights, aisle or passageway lighting, lavatory lighting, galley lighting, or lighting for the interior of storage compartments such as overhead bins or closets. In some implementations, the external lighting systems 102 may provide varied illumination characteristics (e.g., amounts of illumination, colors of illumination) to passenger suites within the aircraft cabin depending on locations of the passenger suites relative to light sources for the external lighting systems 102 as well as heights and locations of privacy panels surrounding the passenger suites that may block at least a portion of the light from the external lighting systems 102 from entering the passenger suites.

In some examples, each of the passenger suites within the aircraft cabin may include an ambient lighting system 104 that can be configured to output varied amounts and colors of illumination to the aircraft cabin as well as to various surfaces of the aircraft cabin based on illumination characteristics of the external lighting systems 102 that are sensed by one or more light sensors 106 of the ambient lighting system 104 that are connected to an ambient lighting 108. In some aspects, each of the light sensors 106 may be red-green-blue-white (RGBW) color sensors that sense amounts of red, green, blue, and white light from the external lighting systems 102. In some implementations, the light sensors 106 include a filtered photodiode configured to detect at least one color of light. In some implementations, the light sensors 106 include a number of filtered photodiodes, each of which may be configured to detect at least one color of light. In an example, the light sensors 106 include four filtered photodiodes, each of which may be configured to detect at least one color of light. In addition, the light sensors 106 can include an unfiltered photodiode configured to sense any light and function as a luminance-detecting element. In addition to the filtered photodiodes, the light sensors 106 may include amplifiers and other associated analog/digital circuitry that may be configured onto a single CMOS chip.

In some implementations, the light sensors 106 can be configured to sense infrared, ultraviolet, and near-ultraviolet spectrum light. In some implementations, the light sensors 106 can be configured to send and/or receive visible-light communication such as LI-FI.

According to some examples, the ambient lighting system 104 may include a controller 108 having circuitry configured to process sensor data obtained by the light sensors 106, determine amounts and colors of light to be output by one or more illumination devices 110 of the ambient lighting system 104 to match and/or complement the sensed illumination characteristics of the external lighting systems 102, and output control signals to the illumination devices 110 to cause light to be output within the aircraft suite corresponding to the determined illumination characteristics of the illumination devices 110.

Figure 2:
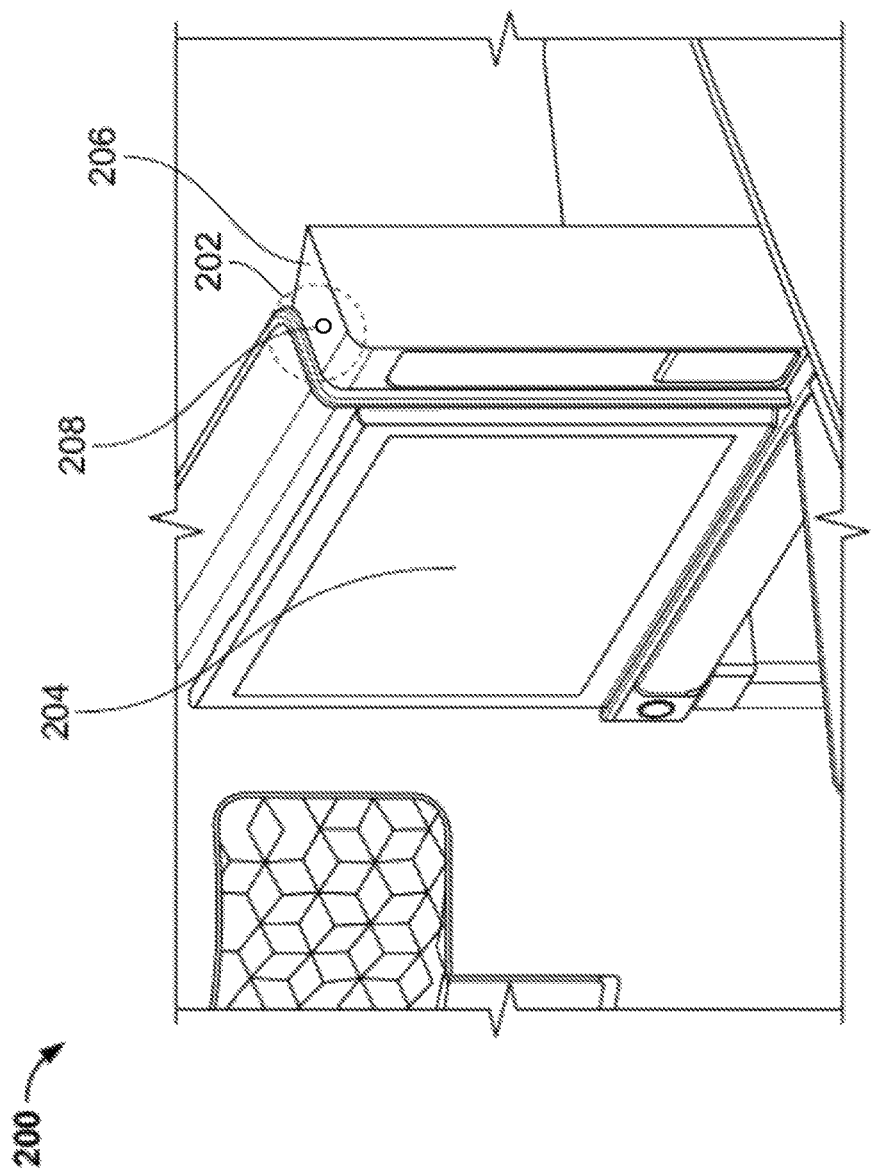
FIG. 2 illustrates a perspective view of a static element within an aircraft suite including an exemplary location for a light sensor disposed within a surface of an aircraft suite.

In some implementations, the light sensors 106 may be disposed within, below, on, or proximate surfaces of static elements of the aircraft suite, such as upper surfaces of partitions, panels, or working surfaces within the suite. For example, FIG. 2 is an illustrative example of a perspective view of a static element 206 within an aircraft suite 200 including an exemplary location 202 for a light sensor 106 in implementations of an ambient lighting system 100. In some examples, the static element 206 is a forward partition wall of an aircraft suite 200 that forms a boundary between the suite 200 and a forward adjacent suite and may include a video monitor 204 disposed on a surface of the static element 200 facing a passenger sitting in a seat (not shown) of the suite 200. In some examples, the location 202 of the light sensor 106 within the aircraft suite 200 may be determined based in least in part on a relative location of the light sensor 106 to the light entering the suite 200 from the external lighting systems 102. For example, the location 202 of the light sensor 106 may be an upper surface of a static element 206 within the suite 200 that is closest to an aisle where illumination devices for a cabin overhead lighting system are located.

Figure 3:
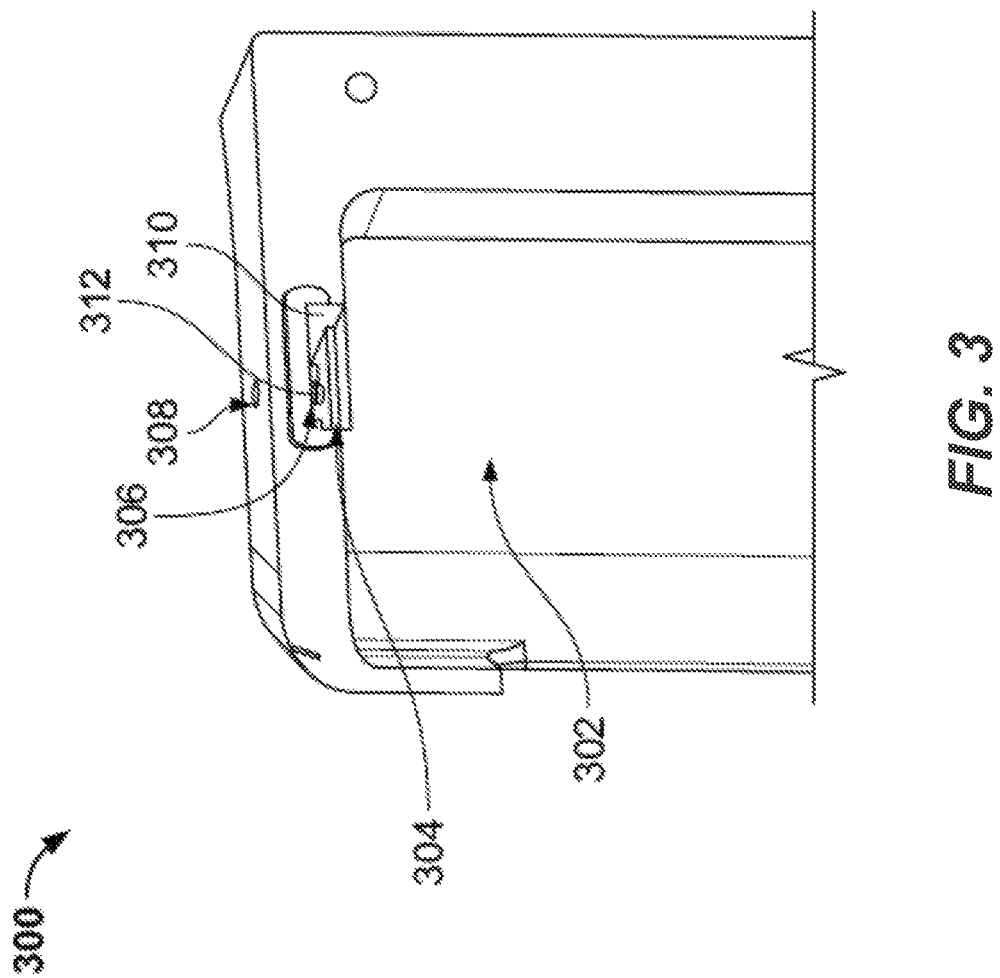
FIG. 3 illustrates a sectional view of a light sensor disposed within a static element an aircraft suite.

In some implementations, the static element 206 may include an orifice 208 disposed on an upper surface that provides a path for light to reach a light sensor 106 located within a hollowed-out portion of the static element 206 below the upper surface. For example, FIG. 3 illustrates a sectional view of a sensing module 306 disposed within a hollowed-out portion 310 of a static element 302 of an aircraft suite 300. In some implementations, the hollowed-out portion 310 of the static element 302 may be positioned below an upper surface of the static element 302 and may have dimensions that correspond to the dimensions of the sensing module 306 such that the sensing module 306 fits snuggly into the hollowed-out portion 310 of the static element 302. In some examples, the hollowed-out portion 310 may be positioned at a distance below the upper surface of the static element 302 that is based on average illumination characteristics of the external lighting systems 102 that may be detectable by the sensing module 306 at the distance from the upper surface. For example, as a sensitivity of the sensing module 306 increases, the distance of the hollowed-out portion 310 from the upper surface of the static element 302 may be increased.

In addition, the static element 302 may include an orifice 308 extending from the upper surface to the hollowed-out portion 310 of the static element 302, thereby providing a path for light from the external lighting systems 102 to enter the hollowed-out portion 310 through the orifice 308 and be detected by the sensing module 306. In some examples, the orifice 308 may have a shape and dimensions that correspond to a shape and dimensions of a sensing element 312 disposed on a surface of a printed circuit board (PCB) 304 of the sensing module 306. For example, the orifice 308 may have a circular, oval, rectangular, or square shape. In some implementations, the orifice 308 may be oriented directly above the sensing element 312 of the sensing module 306 or may be oriented at an angle from the sensing element 312 that allows a greatest amount of light from the external lighting system 102 to enter the hollowed-out portion 310 of the static element 302 through the orifice 308.

For example, an orientation angle of the orifice 310 extending from the upper surface to the hollowed-out portion 310 of the static element 302 may correspond to a relative angle between the orifice 308 and a light source for the external lighting system 102, such as light sources for an overhead cabin lighting system. In another example, the sensing module 306 may be disposed directly on the upper surface of the static element 302 such that the orifice 308 and hollowed-out portion 310 may not be included as parts of the static element 302.

In some implementations, the sensing module 306 disposed within the hollowed-out portion 310 of the static element 302 may include at least one sensing element 310 disposed on a surface of PCB 304 along with any associated circuitry. In some aspects, the sensing element 312 may be a RGBW color sensor that senses the amount of red, green, blue, and white light from the external lighting systems 102. According to some examples, the sensing module 306 may include a controller, such as controller 108 (FIG. 1), with circuitry configured to process sensor data obtained by the sensing element 312, determine amounts and colors of light to be output by one or more illumination devices 110 of the ambient lighting system 104 to match and/or complement the sensed illumination characteristics of the external lighting systems 102, and output control signals to the illumination devices 110 to cause light to be output within the aircraft suite corresponding to the determined illumination characteristics of the illumination devices 110. In some implementations, the controller 108 may be integrated as part of the sensing module 306 such that the sensing module 306 is a standalone device configured to control the illumination devices of the ambient lighting system 104. In other implementations, the controller 108 may be remote from the sensing module 306 and connected via a wired or wireless communication network to the sensing module 306.

Referring back to FIG. 1, in some examples, the controller 108 for the ambient lighting system 104 may determine the illumination characteristics of the external lighting system 102 based on sensor data obtained by a single light sensor 106 disposed on or within a static element of a passenger suite or multiple light sensors 106 at various locations within the suite. In some implementations, the ambient lighting system 104 may use sensor data obtained by a combination of the light sensors 106 disposed at multiple locations throughout the passenger suite to assess the illumination characteristics of the external lighting systems 102. In some examples, one of the light sensors 106 within the suite may be designated as a primary light sensor for the suite, and sensor data obtained by the primary light sensor may be used to determine the illumination characteristics of the external lighting systems 102, and any other light sensors 106 within the passenger suite may be used as secondary or backup light sensors in an event where the primary light sensor malfunctions or fails or the sensor data obtained by the primary light sensor is determined to be unacceptable. In other examples, the controller 108 may determine the illumination characteristics of the external lighting systems 102 based on the sensor data obtained by multiple light sensors 106 within the passenger suite. For example, the controller may use an average or weighted average of the sensor data obtained by all of the light sensors associated with the passenger suite to determine the illumination characteristics of the external lighting systems 102. In examples where a weighted average is used, the controller 108 may weigh the sensor data obtained by the light sensors 106 based on a relative proximity of each of the light sensors 106 within the suite to light sources for the external lighting systems 102.

In some examples, obtained sensor data by the light sensor 106 may be determined to be unacceptable in implementations where the light sensor 106 is blocked from receiving light from the external lighting systems 102. For example, the light sensor 106 may become blocked by a flight attendant passing through the aisle of the aircraft cabin to provide food or beverages to the passengers in the suites or a hand or other object is placed on the surface of a static element where the lighting sensor 106 is installed, thereby blocking the lighting sensor 106 from sensing light from the external illumination systems 106. In some implementations, the controller 108 may detect blockage of the light sensor 106 based on a sudden reduction in illumination detected at the light sensor 106 without corresponding reductions in illumination detected by other light sensors 106 within the aircraft cabin. In examples where a blockage of a light sensor 106 is detected, the controller 108 may use one of the secondary or backup light sensors to detect the illumination characteristics of the external lighting systems 102. In one example, the secondary or backup light sensors may include light sensors installed within other aircraft suites within the aircraft cabin, such as adjacent suites.

In some aspects, passenger suites that are adjacent to fuselage windows within the aircraft cabin or are exposed to a detectable amount of light entering the cabin from outside the aircraft may include one or more light sensors 106 attached adjacent to one or more fuselage windows that are proximate the passenger suite. In some implementations, the controller 108 may adjust the amount of light output by the illumination devices 110 to compensate for the light entering the passenger suite through the fuselage windows. For example, in implementations where the illumination devices 110 of the ambient lighting system 104 are configured to match the detected illumination characteristics of the external lighting systems 102, the controller 108 may remove the contribution of light detected at the light sensors 106 adjacent to the windows from illumination characteristics detected at the other light sensors 106 within the passenger suite, which may result in a reduction in the amount of light output by the illumination devices 110 of the ambient lighting system 104.

In some examples, the illumination devices 110 within the lighting zones of the passenger suites may include combinations of colored light emitting diodes (LEDs), LED washlights, infrared (IR) lights, and high-intensity discharge (HID) lights. In some implementations, the illumination devices 110 may include red, green, blue, and white washlights that are configured to output light in various combinations of intensity to represent different colors of light. In some examples, the lighting zones may be defined by locations, equipment, or compartments within the passenger suite.

In some implementations, the ambient lighting system 104 may include one or more lighting zones within a passenger suite that may include individually controllable illumination devices 110 associated with each of the lighting zones such that the illumination devices 110 for each lighting zone may output light in different colors and amounts of illumination than other zones within the suite. In some aspects, the illumination devices 110 may be configured to output flashing light and/or rotate colors in a predetermined pattern.

For example, a first lighting zone may be defined by a suite partition surface that includes a video monitor, a second lighting zone may be defined by a foot well of the suite that includes an ottoman and any surfaces adjacent to the foot well, a third lighting zone may be defined by an amenities console, such as a beverage bar including a beverage storage compartment and an associated tray table, and a fourth lighting zone may be defined by a closet are area of the suite where the passenger can store coats, luggage, or other personal effects. In other examples, multiple lighting zones may be combined to form a lighting super-zone that encompasses multiple lighting zones within a suite, an entire suite, or multiple suites within the aircraft cabin.

As an illustrative example, FIGS. 4A-4D provide exemplary views of an aircraft passenger suite 400 that includes an ambient lighting system described in the implementations herein including multiple lighting zones. The non-limiting passenger suite 400 described with respect to FIGS. 4A-4D along with corresponding lighting zones are merely exemplary. The ambient lighting system may also be configured for other passenger suite and/or lighting zone configurations.

Figure 4A:
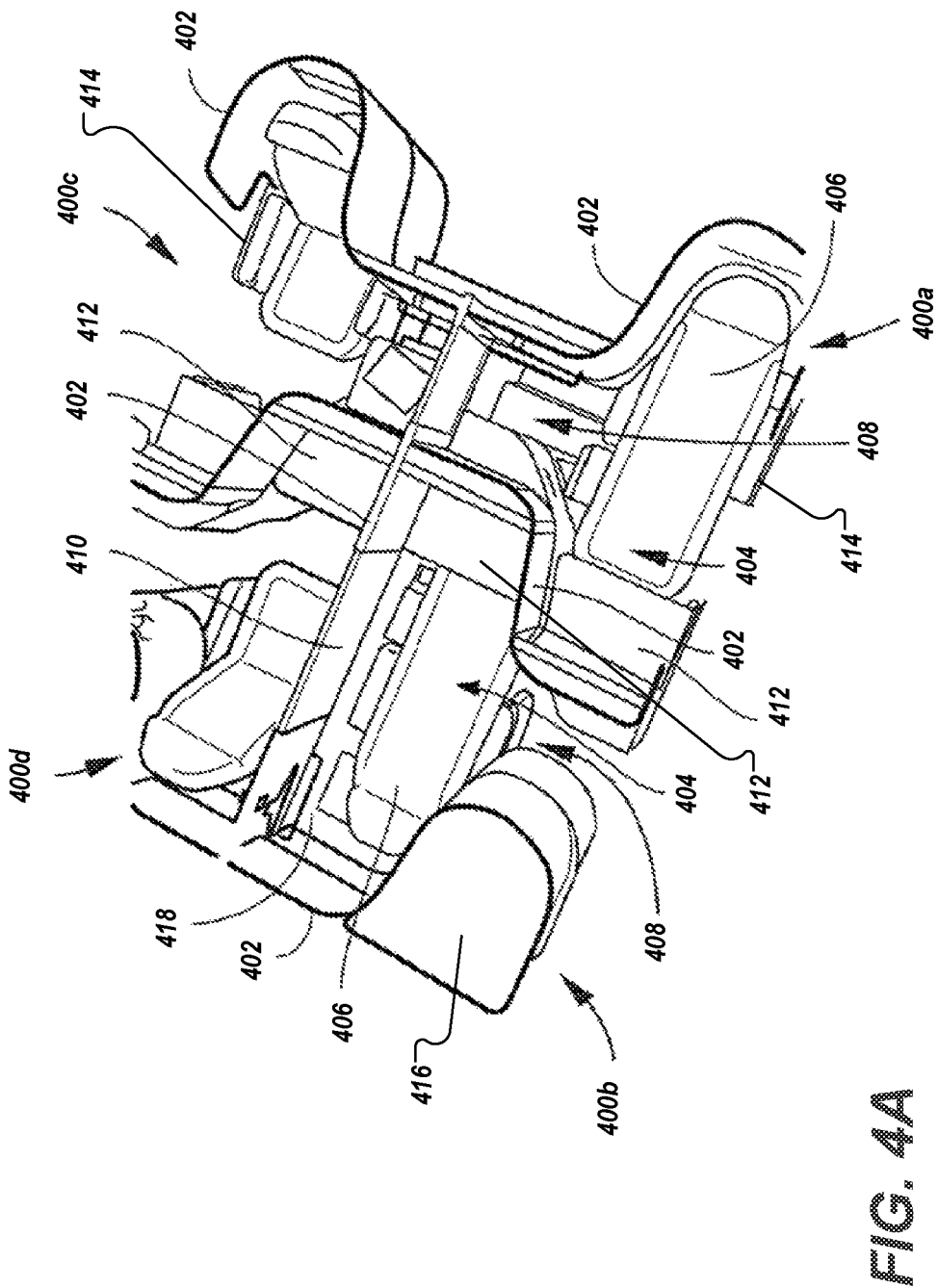
FIG. 4A illustrates an overhead plan view of exemplary aircraft passenger suites in a nested arrangement.

Referring to FIG. 4A, a passenger seating arrangement is shown including first and second nesting passenger suites 400a, 400b each bound by one or more privacy walls 402 defining a seating area 404 including a seat 406 with a seat back 436 and seat bottom 438 configured to achieve a horizontal bed position and a living area 408 positioned next to the seating area and including at least one amenity for use by a passenger in the suite. In some implementations, the first and second suites 400a, 400b nest in a column arranged parallel to the longitudinal axis of the aircraft. In one example, the first and second suites 400a, 400b share a privacy wall 402 at one end that separates the seating area of the first suite 400a from the living area of the second suite 400b and the living area of the first suite 400a from the seating area of the second suite 400b.

In some aspects, the first and second suites 400a, 400b overlap in the longitudinal direction to form a column of alternating first and second suites including any number of suites. The seats 406 in the first and second suites 400a, 400b may face each other and may be laterally offset with respect to a longitudinal axis of the suites. In some examples, an entrance to the first suite 400a is through the seating area 404 of the first suite, thus providing an 'outboard' seat, while the entrance to the second suite 400b is through the living area 408 of the second suite, thus providing an 'inboard seat, inboard and outboard defined with respect to the aisle.

The living area 408 of the first suite 400a shares a privacy wall 402 with the living area 408 of a third suite 400c in a laterally adjacent column. In some implementations, the third suite 400c is a mirror image of the first suite 400a about an imaginary line between the columns. The seating area 404 of the second suite 400b shares a privacy wall 402 with the seating area 404 of a fourth suite 400d in a laterally adjacent column and is a mirror image of the second suite. Thus, columns may be arranged parallel and adjacent to other columns with 'mirror-image' suites laterally aligned. In some implementations, privacy walls 402 between adjacent suites may include portions that can be opened/closed or raised/lowered to open the suites depending on the desired degree of privacy. For example, partition 410 between suites 400c and 400d can be opened or closed depending on a desired amount of privacy.

In some implementations, light sensors 106 for the ambient lighting system 104 (FIG. 1) may be disposed on or within any static elements or surfaces within the suites 400 and associated partitions 402, 410. For example, the light sensors 106 may be disposed within an interior or on upper surfaces of partitions 402, 410, ottoman 412, seat 406, aisle-side privacy panels 414, or storage console 416. In addition, each of the suites 400 may be configured as a single zone of the ambient lighting system 104, and in some examples, more than one of the suites 400 may be designated as a single super-zone that is controlled by the controller 108. In some implementations, multiple suites 400 may be assigned to a super-zone in instances where a component, such as a light sensor 106, controller 108, or other associated circuitry for a particular suite 400 malfunctions or becomes inoperable. When malfunction of a light sensor 106 or controller 108 occurs, the illumination devices 110 for that suite 400 may be controlled by the controller 108 of another suite 400 within the aircraft cabin.

Figure 4B:
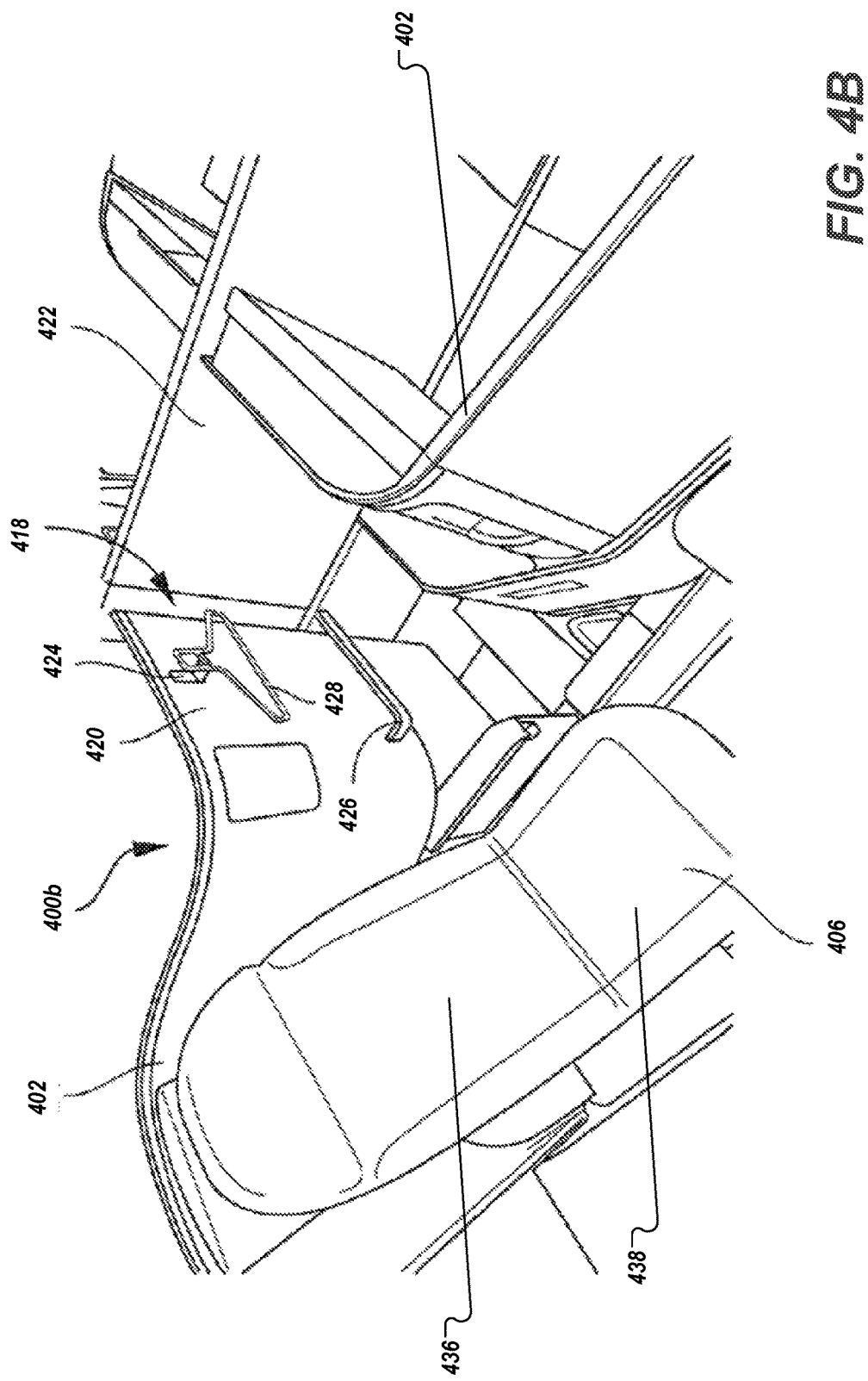
FIG. 4B illustrates an aisle-side perspective view of an exemplary aircraft passenger suite.

Referring to FIG. 4B, one amenity associated with each of the suites 400 is a closet 418 for the neat and orderly stowage of garments, luggage, or other personal effects. Suites 400a and 400b may include a closet in the living are 408 that is open to the suite and is partly formed by the intersection of a rear privacy wall 420 defining the rear boundary of the suite and a side privacy wall 422 defining the side boundary of the suite. A generally linear portion of the rear privacy wall 420 adjacent the seat 406 and facing in the 'forward' direction may serve as the mounting surface for closet accessories for hanging and stowing garments, bedding, etc. Suites 400c and 400d may include a closet 418 in the seating area 404 positioned alongside the seat 406 and partly formed by the intersection of the side privacy wall 422 defining the side boundary of the suite and the rear privacy wall 420 defining the rear boundary of the suite, as shown in FIG. 4A. In some examples, a generally linear portion of the side privacy wall facing in the direction of the seat may serve as the mounting surface for closet accessories for hanging and stowing garments, bedding, etc.

In any suite configuration, the accessories may include a deployable hanger hook 424 positioned near the top of the privacy wall and a retention bar 426 positioned vertically below the hanger hook. The hanger hook 424 is configured to fold flush against the privacy wall when not in use and may be used by itself or to support a stowable hanger 428. The retention bar 426 may be used to hang items or to retain long items hung on the hanger hook 424 or hanger 428 substantially against the privacy wall, for example, suit coats. The space immediately forward of the privacy wall and below the retention bar 426 is preferably free space clear of obstructions so that garments and bedding can hang straight.

In some implementations, the surfaces, components, and compartments of the closet 418 and adjacent to the closet 418, (e.g., rear privacy wall 420, side privacy wall 422 deployable hangar hook 424, retention bar 426, stowable hangar 428) may be part of a closet lighting zone of the ambient lighting system 104. In some implementations, illumination devices 110 of the closet lighting zone may display the same color and amount of illumination based on the sensed illumination characteristics of the external lighting systems 102 and ambient lighting preferences of a passenger input at an input/output device, such as video monitor 430 and/or suite control panel 432. In addition, the privacy wall 402 to the rear of the seat 406 as well as the seat 406 may make up a seat lighting zone such that each of the illumination devices 110 configured to illuminate the surfaces and components of the seat lighting zone display the same color and amount of illumination characteristics as the other illumination devices 110 within the same lighting zone.

Referring to FIGS. 4A and 4C, each suite 400 may include an ottoman 412 positioned forward of and apart from the seat 406. The ottoman 412 and the seat 406 may reside in a common horizontal plane when the seat 406 is in the lie-flat position such that the ottoman 412 and seat 406 collectively form a bed. In some implementations, a video monitor 430 may be positioned on the privacy wall 402 forward of the seat 406 vertically above the ottoman 412. In some examples, a working surface 434 such as a tray table is connected to the privacy wall 402 forward of the seat 406 below the video monitor 430 and above the ottoman 412. A suite control panel 432 may be positioned forward of the seat 406 in reach of a seated passenger. In some implementations, the suite control panel 432 may interface with the video monitor 430, which may operate cooperatively as input/output devices that allow a passenger to adjust settings for the ambient lighting system 104 via an interface at the video monitor 430. In some examples, the privacy wall 402 forward of the seat 406 below the working surface 434 along with the ottoman 412 as well as any proximate surfaces or compartments may make up a foot well lighting zone such that each of the illumination devices 110 configured to illuminate the surfaces and components of the foot well lighting zone display the same color and amount of illumination characteristics as the other illumination devices 110 within the same lighting zone. Similarly, the privacy wall 402 forward of the seat 406 adjacent to the video monitor 430 as well as any proximate surfaces or compartments may make up a monitor lighting zone.

Figure 4D:
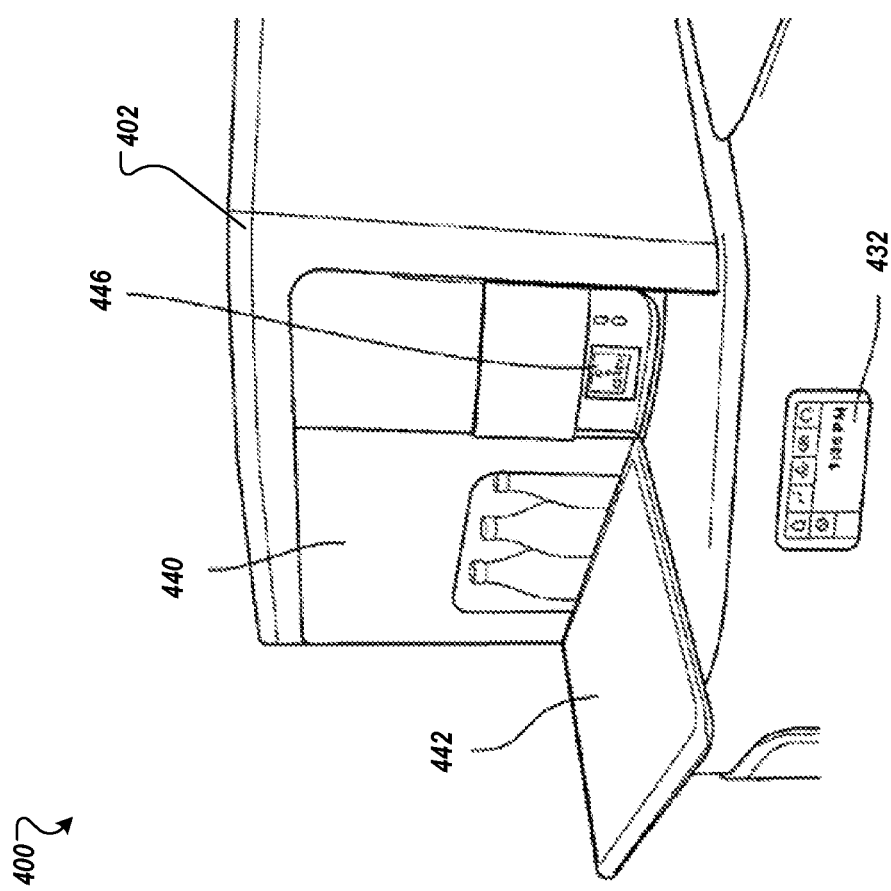
FIG. 4D illustrates a detailed view of a passenger amenities portion of an aircraft passenger suite.

Referring to FIGS. 4C-4D, each suite 400 includes a beverage bar 440 having a door 442 configured to pivot open to provide an auxiliary horizontal table vertically spaced from an underlying countertop 444 to permit simultaneous use of the auxiliary horizontal table for beverages and the underlying counter for low-lying items such as cell phones, tablets, laptops and other items. The countertop 444 is positioned in the living area 408 to the side of and slightly forward of the seat 406. The beverage bar 440 is located in the living area 408 of the suite and is integrated into the cabinetry. The beverage bar 440 may be configured to hold beverages and may include refrigeration for cooling the beverages. A door 442 to the beverage bar 440 may be insulated and provide a sealing function.

In some examples, the door 442 is hinged along the bottom edge to the beverage bar cabinet and pivots vertically between opened and closed positions. The door 442 may be positioned vertically in the closed position and horizontally in the open position. In some examples, the door 442 is hinged to the beverage bar 440 at a position vertically above the countertop 444. The hinge may be configured or a stop may otherwise be provided for limiting pivoting movement of the door 442 to about 90 degrees such that the auxiliary table resides horizontally when fully open. The space between the underlying countertop 444 and the door 442 in the fully open position allows the passenger to simultaneously utilize the auxiliary table and the countertop. The beverage bar 440 may have a shallow depth and incorporate into its backside the video monitor of the adjacent suite. In addition, a surface adjacent to the beverage bar 440 may include a docking station 446 including a power outlet and/or data port configured to allow passengers to charge and/or operate electronic devices during a flight. In some examples, the privacy wall 402 forward of the seat 406 and adjacent to video monitor 430 that includes the beverage bar 440 and docking station 446 as well as any proximate surfaces or compartments may make up a beverage bar lighting zone such that each of the illumination devices 110 configured to illuminate the surfaces and components of the beverage bar lighting zone display the same color and amount of illumination characteristics as the other illumination devices 110 within the same lighting zone.

Referring back to FIG. 1, each of the lighting zones for the ambient lighting system 104 described above includes one or more illumination devices 110 that are configured to output light based on ambient lighting settings selected by the passenger at an I/O device, such as the video monitor 430 and/or the suite control panel 432. In some examples, each of the lighting zones within a passenger suite may have a dedicated light sensor 106 disposed on or within a surface of a static element within or adjacent to the lighting zone that senses the lighting characteristics of the external lighting system 102 that are used to determine the light color and amount of illumination (also referred to as light intensity of luminance) output by the illumination devices 110 for the corresponding lighting zone. In other examples, sensor data received a single light sensor 106 and/or multiple light sensors 106 may be used to determine the light colors and amounts of illumination output by the illumination devices 110 for all of the lighting zones within the passenger suite.

In some examples, the lighting characteristics or properties of the light output by the illumination devices 110 onto the surfaces of the passenger suite may be based on an ambient lighting scheme selected by the passenger or flight attendant or automatically determined by the ambient lighting system 104 for the suite. For example, the ambient lighting system 104 may automatically determine the lighting scheme based on a sensed status of the passenger within the suite (e.g., awake, asleep, eating/drinking, working) or may also apply a default ambient lighting scheme in the absence of a selected ambient lighting scheme.

Figure 5:
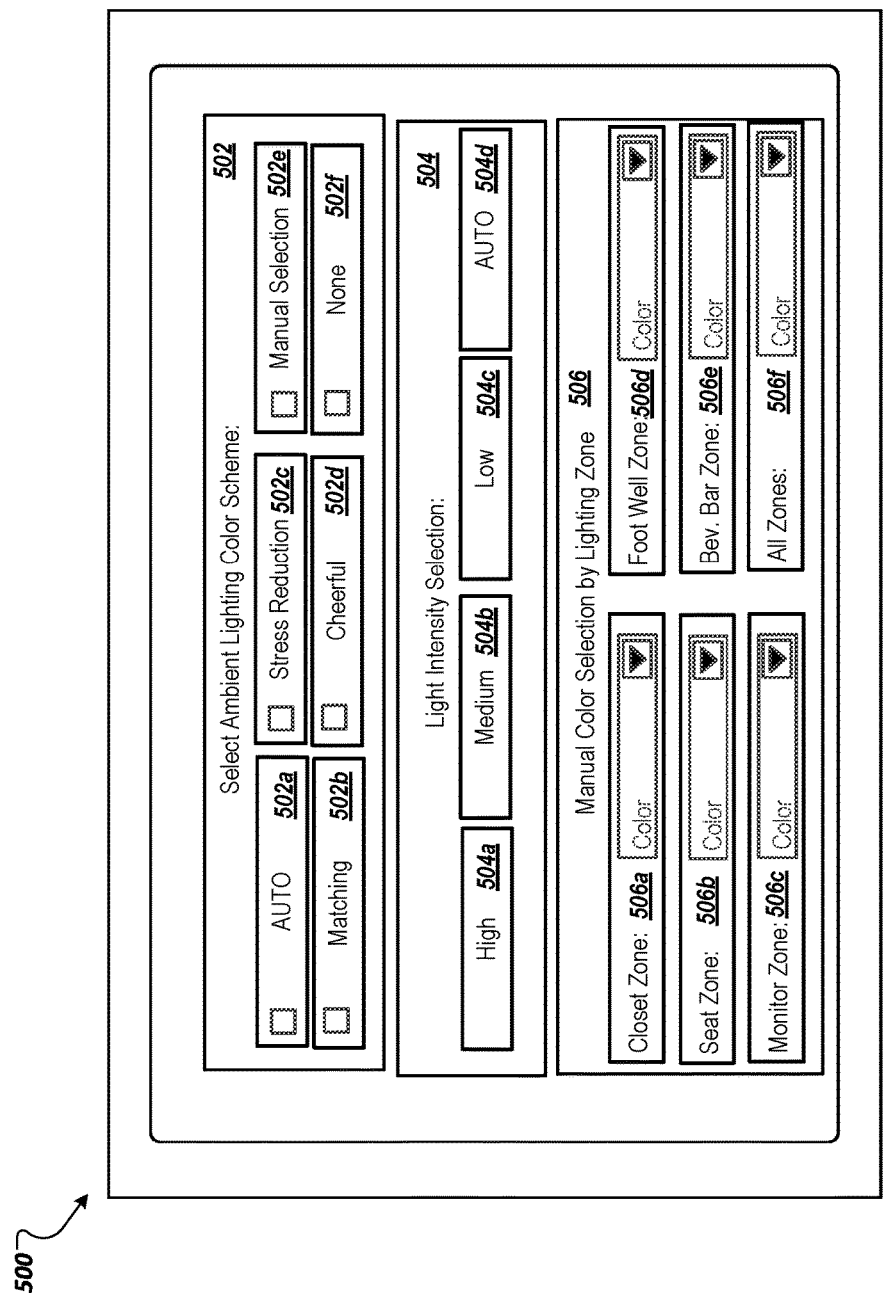
FIG. 5 illustrates an exemplary user interface screen provided to a computing device selection of ambient lighting settings of an aircraft passenger suite.

For example, FIG. 5 illustrates an exemplary user interface screen 500 provided to a computing device for selection of ambient lighting settings of an aircraft passenger suite. In some implementations, the user interface screen 500 is presented to an I/O device of a passenger or flight attendant, such as the video monitor 430 and/or the suite control panel 432 within the passenger suite 400 (FIGS. 4C-4D). The user interface screen 500 includes various selectable and free text fields that allow the passenger or flight attendant to select an ambient lighting scheme for the suite, select a preferred light intensity output by the illumination devices 110 of the ambient lighting system, and manually select lighting colors for each lighting zone within the aircraft suite. The input fields of the user interface screen 500 are not meant to be limiting and other input fields may be provided that allow passengers and/or flight attendants to control how the ambient lighting system 104 displays light onto the surfaces of the suite.

In some implementations, the user interface screen 500 may include a color scheme selection field 502 that provides for selecting a color scheme for the light output by the illumination devices 110 of the ambient lighting system 102. Based on the received selection at the color scheme selection field, the controller 108 can output control signals to the illumination devices 110 for each of the lighting zones based on stored color scheme data that may include light colors and light color rotation patterns for each of the lighting zones for each color scheme in the color scheme selection field 502.

In some examples, AUTO selection 502*a* may also be referred to as a default selection where the controller 108 causes the illumination devices 110 for each of the lighting zones to output light having default colors, intensities, and color rotation patterns stored in memory. For matching selection 502*b*, the controller 108 may cause the illumination devices 110 of the suite to output light having illumination characteristics that match the sensed illumination characteristics of the external lighting systems 102. The stress reduction 502*c* and cheerful 502*d* selections represent exemplary selectable color schemes having predetermined settings stored in memory of the ambient lighting system 104. For example, the stress reduction selection 502*c* may include lighting colors and intensities for the illumination devices 110 that approximate colors that may be known to promote stress reduction and relaxation (e.g., lavender, pale grey, cool blue). In addition, the cheerful selection 502d may include lighting colors and intensities for the illumination devices 110 that approximate colors that may be known to promote mood improvement (e.g., red, orange, yellow, pink, etc.). The color scheme selection field 502 may also include a manual selection 502e that allows a user to manually select the colors and light intensities for the illumination devices 110 for each lighting zone within the passenger suite at light intensity selection field 504 and a manual color selection field 506. For a color scheme selection of none 502f, the ambient lighting system 104 may turn off the illumination devices 110 for one or more of the zones of the suite.

In some implementations, the user interface screen 500 includes a light intensity selection field 504 where a user can manually adjust the intensity of light output by the illumination devices 110 by selecting high 504a, medium 504b, or low 504c selections. In some examples, instead of or in addition to the high, medium, and low selections, the light intensity selection field 504 may allow the user to select a percentage of a maximum light intensity to be output by the illumination devices 110.

For an AUTO selection 504d at the light intensity selection field 504, the controller 108 may adjust a relative intensity of light output by the illumination devices based on the sensed illumination characteristics of the external lighting systems 102. In some implementations, the controller 108 may adjust the relative intensity of the illumination devices directly proportionally to sensed changes in the intensity of light output by the external lighting systems 102. For example, the intensity of light output by the illumination devices 110 may be increased as the intensity of light output from the external lighting systems 102 increases. Similarly, the controller 108 may adjust the relative intensity of the illumination devices inversely proportionally to sensed changes in the intensity of light output by the external lighting systems 102. For example, the intensity of light output by the illumination devices 110 may be increased as the intensity of light output from the external lighting systems 102 decreases.

In some examples, the user interface screen 500 includes a manual color selection field 506 where a user can manually adjust the color of light output by the illumination devices 110 for each of the lighting zones within a passenger suite. For example, the manual color selection field 506 may include drop-down color selection fields for a closet zone 506a, seat zone 506b, monitor zone 506c, foot well zone 506d, and beverage bar zone 506e. In addition, the manual color selection field 506 may also include an "all zones" field that allows the user to manually set the illumination devices for all zones within the passenger suite to a single color.

Referring back to FIG. 1, in addition to controlling the illumination devices 110 based on selections made at the user interface screen, the controller 108 may also adjust the lighting characteristics or properties of light output by the illumination devices 110 based on a sensed passenger status (e.g., presence and, optionally, activity). Sensing the status of the passenger, in some embodiments, includes monitoring for inputs from the passenger at an I/O device, such as at a touchscreen monitor within the passenger suite. For example, the passenger may be detected as present and/or awake based upon interaction with an entertainment system via the I/O device. In another example, status may be sensed based on interactions with a control panel within the passenger suite or upon a passenger suite fixture. For example, in calling for a cabin attendant, the lighting may be adjusted to drawn attention to the passenger suite.

In some embodiments, status of the passenger is determined through monitoring sensor data from received sensors within a passenger suite. The sensors, in some examples, may be analyzed for indications that the passenger has awoken, gone to sleep, or entered/left the suite. For example, armrests and working surfaces within the suite may include pressure sensors or position sensors that detect when the passenger has placed an object on the those surfaces, indicating that the passenger may be awake and eating and/or working. In addition, the actuators for a seat may include pressure and/or contact sensors that provide an indication of whether the seat s in an upright or lie-flat position, which may indicate whether the passenger is awake or asleep. The suite may also include motion sensors at various points throughout the aircraft that can detect movement of the passenger. In some examples, based on the sensor data received from the motion sensors, the controller may determine that the passenger has exited or entered the suite or that the passenger is moving and awake or, conversely, not moving, indicating that the passenger may have drifted off to sleep. In some implementations, the controller 108 may turn off or reduce the intensity of light output by the illumination devices 110 when the sensed passenger status indicates that the passenger has exited the passenger suite or has gone to sleep. Similarly, the controller may turn on or increase the intensity of light output by the illumination devices when the sensed passenger status indicates that the passenger has entered the suite or has awoken from sleep.

Figure 6:
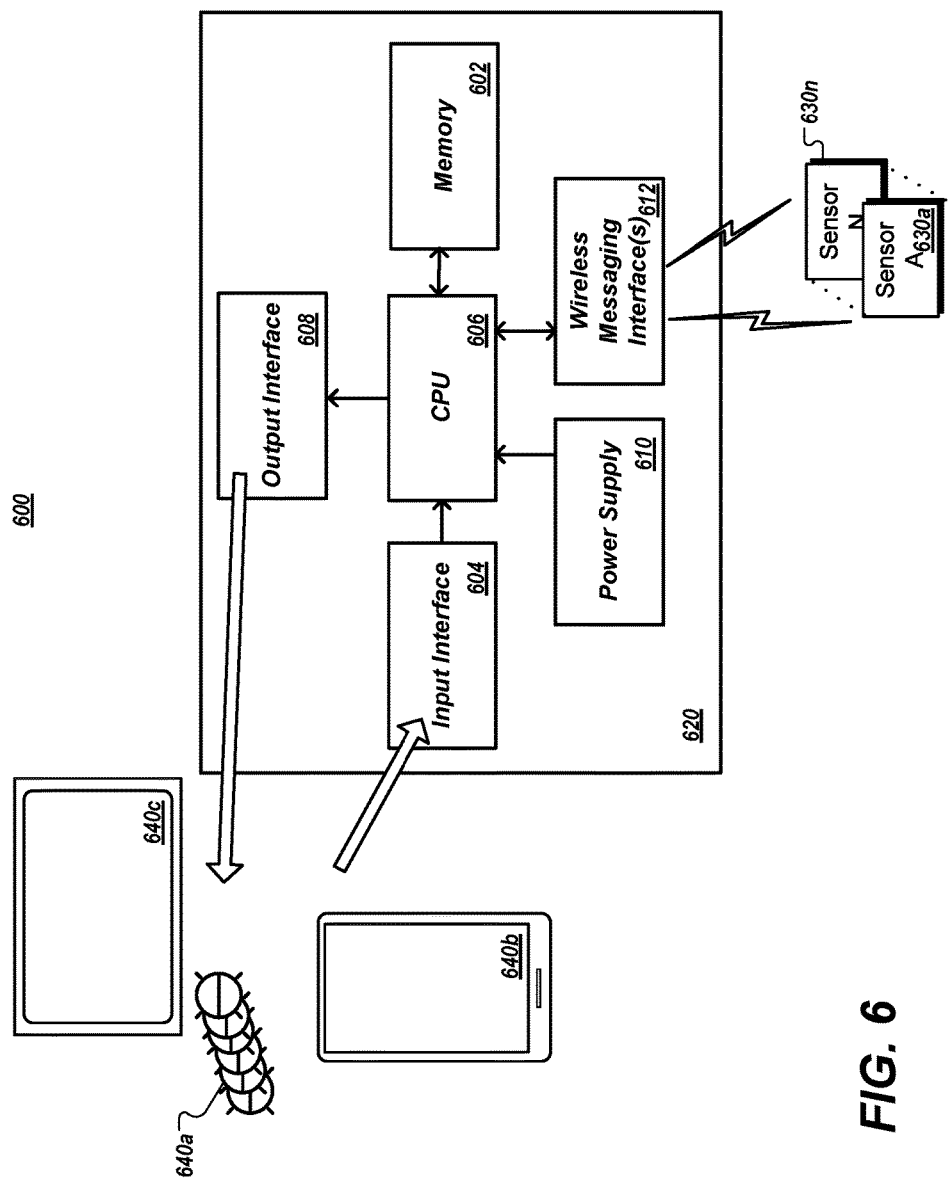
FIG. 6 is a block diagram of example circuitry to collecting position information from a number of wireless sensors and reporting position information via a user interface.

In some examples, processing of sensor data obtained by the light sensors 106, determining amounts and colors of light to be output by one or more illumination devices 110 of the ambient lighting system 104 to match and/or complement the sensed illumination characteristics of the external lighting systems 102, and outputting control signals to the illumination devices 110 to cause light to be output within the aircraft suite corresponding to the determined illumination characteristics of the illumination devices 110 may be performed by control circuitry such as a programmable logic controller (PLC) or central processing unit (CPU) that executes one or more software processes and outputs position information to other controllers and electronically-activated components. FIG. 6 provides a simplified hardware block diagram of control circuitry 620 of an ambient lighting system 600. The description of the control circuitry 620 is not meant to be limiting, and can include other components than those described herein. References to control circuitry 620 relate to the circuitry of one or more processing circuits, which can also be referred to interchangeably as processing circuitry. The control circuitry 620 may include a central processing unit (CPU) 606 that executes one or more software processes associated with the system 600. Software instructions for the processes can be stored in memory 602.

In some examples, the memory 602 can include both volatile and non-volatile memory and can store various types of data associated with executing the processes related to collecting sensor data from sensors 630a through 630n, which may include the lighting sensors 106 disposed throughout the passenger suite, processing the sensor data to determine illumination characteristics of the external lighting system 102, and controlling illumination devices 640a of the ambient lighting system 100 to match or complement the sensed illumination characteristics of the external lighting systems 102. In some examples, the sensors 630a through 630*n* may also include other types of sensors, such as sensors associated with determining a status of a passenger within a suite.

The control circuitry 620 includes an input interface 604 for communicating with various devices 640 that provide configuration and settings inputs to the control circuitry 620 such as illumination device(s) 640*a*, personal electronic device(s) 640*b*, and console display(s) 640*c*. and any other device associated with the system 600. The control circuitry 620 also includes an output interface 608 for connecting and providing information to devices 640 communicating with the control circuitry 620 including the illumination device(s) 640*a*, personal electronic device(s) 640*b*, and console display(s) 640*c*, and any other device communicating with the control circuitry 620. The control circuitry 620 also includes a power supply 610, such as a battery connection or wired connection to an electrical power source within the aircraft cabin. Further, the control circuitry 620 includes one or more communication interfaces 612, which may include wireless messaging interfaces, that enable the control circuitry 620 to collect sensor signals supplied by the sensors 630. In some examples, the sensors 630 may also interface with the system 600 via wired connections to the control circuitry 620.

In some implementations, the memory 602 of the control circuitry 620 includes instructions for executing one or more engines or modules that perform processes associated with collecting and interpreting messages provided by the sensors 630 and communicating information regarding the sensor system to the devices 640. In some implementations, lighting schemes associated with each of various ambient lighting settings may be stored in the memory 602 along with lighting zone configurations for aircraft suites. In addition, information associated with how the sensors 630*a* through 630*n* are configured throughout the passenger suite, such as locations of the sensors 630*a* through 630*n* within the suites and whether the sensors 630*a* through 630*n* are primary sensors or secondary sensors may also be stored in the memory 602 of the system 600.

In some implementations, short range wireless communication is provided through Bluetooth wireless communication technology. In other embodiments, Ultra Wide Band (UWB) or ZigBee wireless communications may be used. The type of wireless communication technology that is used for the implementations described herein can be based on various factors that can include battery life, data usage, security and/or line-of-sight restrictions, and other concerns. In some embodiments, ZigBee or Bluetooth wireless communications may be used in applications where link security is prioritized. In other embodiments where frequency interference is a concern, Bluetooth or UWB communications may be used since both technologies use adaptive frequency hopping to avoid channel collision. In embodiments where a total of frequency channels is prioritized, Bluetooth wireless communications may be used.

Figure 7:
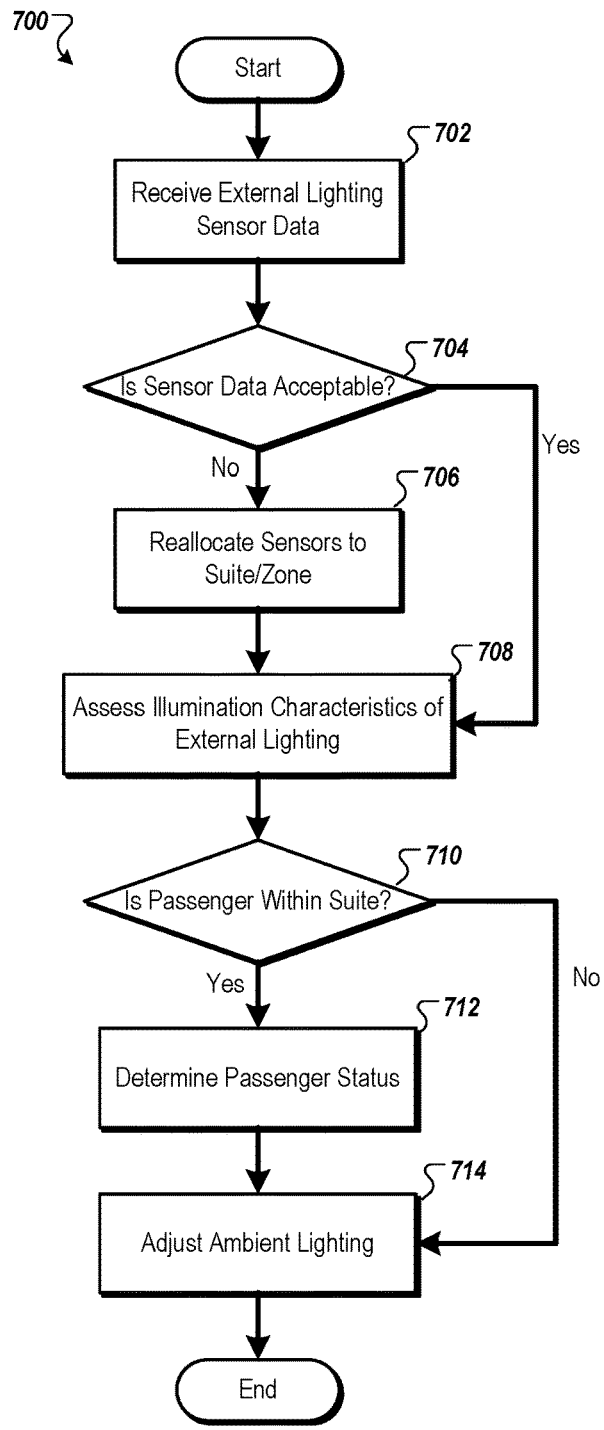
FIG. 7 illustrates an exemplary flow diagram of a method for controlling an ambient lighting system of an aircraft passenger suite.

Turning to FIG. 7, a flow chart illustrates in example method 700 for controlling an ambient lighting system within an aircraft passenger suite such as the ambient lighting system 600 discussed in relation to FIG. 6. While the flow diagram illustrates an ordering of steps or blocks of the method 700, it can be understood that the various steps and processes associated with the method 700 can be performed in any order, in series, or in parallel. In some implementations, the method 700 begins with receiving sensor data from one or more lighting sensors disposed on surfaces or within an interior one or more static elements of an aircraft passenger suite (702) that are configured to detect illumination characteristics of external lighting systems within an aircraft cabin, such as overhead cabin lighting systems, overhead reading lights, aisle or passageway lighting, lavatory lighting, galley lighting, or lighting for the interior of storage compartments such as overhead bins or closets.

In some implementations, if the received sensor data from a light sensor disposed within the passenger suite are determined to be unacceptable (704), then in some examples, one or more light sensors from another suite or zone may be allocated to provide sensor data to the system 600 (706). In some examples, obtained sensor data by a light sensor may be determined to be unacceptable in implementations where the light sensor is blocked from receiving light from the external lighting systems. For example, the light sensor may become blocked by a flight attendant passing through the aisle of the aircraft cabin to provide food or beverages to the passengers in the suites or a hand or other object is placed on the surface of a static element where the lighting sensor is installed, thereby blocking the lighting sensor from sensing light from the external illumination systems. In some implementations, the system 600 may detect blockage of the light sensor based on a sudden reduction in illumination detected at the light sensor without corresponding reductions in illumination detected by other light sensors within the aircraft cabin. In examples where a blockage of a light sensor is detected, the system 600 may allocate one of the secondary or backup light sensors to detect the illumination characteristics of the external lighting systems. In one example, the secondary or backup light sensors may include light sensors installed within other aircraft suites within the aircraft cabin, such as adjacent suites.

In some implementations, the system 600 may use sensor data obtained by a combination of the light sensors disposed at multiple locations throughout the passenger suite to assess the illumination characteristics of the external lighting systems (708). In some examples, one of the light sensors within the suite may be designated as a primary light sensor for the suite, and sensor data obtained by the primary light sensor may be used to determine the illumination characteristics of the external lighting systems, and any other light sensors within the passenger suite may be used as secondary or backup light sensors in an event where the primary light sensor malfunctions or fails or the sensor data obtained by the primary light sensor is determined to be unacceptable. In other examples, the system 600 may determine the illumination characteristics of the external lighting systems based on the sensor data obtained by multiple lighting sensors within the passenger suite. For example, the controller may use an average or weighted average of the sensor data obtained by all of the light sensors associated with the passenger suite to determine the illumination characteristics of the external lighting systems. In examples where a weighted average is used, the system 600 may weigh the sensor data obtained by the light sensors based on a relative proximity of each of the light sensors within the suite to light sources for the external lighting systems.

In some implementations, if a sensed passenger status indicates that the passenger is within the suite (710), then in some examples, a status of the passenger may be determined based on received sensor data from one or more sensors within the suite (712). Sensing the status of the passenger may include monitoring for inputs from the passenger at an I/O device, such as at a touchscreen monitor within the passenger suite as well as monitoring sensor data from received sensors within a passenger suite indicating that the passenger has awoken, gone to sleep, or entered/left the suite. For example, armrests and working surfaces within the suite may include pressure sensors or position sensors that detect when the passenger has placed an object on the those surfaces, indicating that the passenger may be awake and eating and/or working. In addition, the actuators for a seat may include pressure and/or contact sensors that provide an indication of whether the seat is in an upright or lie-flat position, which may indicate whether the passenger is awake or asleep. The suite may also include motion sensors at various points throughout the aircraft that can detect movement of the passenger. In some examples, based on the sensor data received from the motion sensors, the controller may determine that the passenger has exited or entered the suite or that the passenger is moving and awake or, conversely, not moving, indicating that the passenger may have drifted off to sleep.

In some examples, the system 600 may adjust the light color, intensity, and/or color rotation of the light output by the illumination devices of the system 600 based on at least one of the sensed illumination characteristics of the external lighting systems, the sensed passenger status, and ambient light system color scheme and light intensity selections made by a passenger and/or flight attendant at a user interface screen of a computing device (714).

The implementations described above that are directed to systems and methods for controlling ambient lighting systems within passenger suites of premium class aircraft cabins allow for greater adaptability of the ambient lighting systems because they may not be dependent upon connections with other external lighting systems within the aircraft when determining whether or not to adjust the characteristics of the illumination devices of the ambient lighting system to match or complement the illumination characteristics of the external lighting systems. In some aspects, the ambient lighting system within each individual aircraft suite may be configured to sense the lighting characteristics within the aircraft cabin independently of any communications with control systems associated with other lighting systems within the aircraft. For example, the ambient lighting system may include one or more light sensors disposed within one or more surfaces of a passenger suite that are configured to detect the lighting characteristics within the aircraft cabin, which may include light color and/or amounts of illumination.

In some implementations, the ambient lighting systems for each of the passenger suites may be standalone systems that may not communicate with any other lighting systems within the aircraft, making the ambient lighting systems hardware agnostic in the way they interface with other external lighting systems in the aircraft. Because the ambient lighting system is hardware agnostic, compatibility specifications for interfacing with other lighting systems within the aircraft cabin may not be required. In addition, the ambient lighting systems may be implemented on an ad hoc basis without having to be integrated with complex wiring and communication circuitry to other systems, which thereby may reduce the complexity of adding additional ambient lighting systems to the aircraft cabin. Also, due to the lack of need for additional wiring and communications equipment, the weight contribution of the ambient lighting systems within the suites to the overall weight of the aircraft can be reduced.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A system for adaptively controlling ambient lighting within a passenger suite of an aircraft cabin comprising:
   a suite light sensor disposed on or within a surface of a static element of the passenger suite, the suite light sensor configured to detect illumination characteristics within a first region of the aircraft cabin;
   a plurality of illumination devices disposed proximate one or more surfaces of the passenger suite, the plurality of illumination devices configured to illuminate the one or more surfaces of the passenger suite;
   at least one external light sensor disposed externally to the passenger suite and configured to detect illumination characteristics within a second region of the aircraft cabin proximate the first region; and
   a controller coupled to the suite light sensor, the at least one external light sensor, and the plurality of illumination devices, wherein the controller comprises control circuitry configured to:
   receive a plurality of signals from each of the suite light sensor and the external light sensor, wherein the plurality of signals each represent at least one of a lighting color and a light intensity,
   analyze the plurality of signals to determine combined illumination characteristics representing at least one of a combined lighting color and a combined light intensity, and
   cause illumination of the one or more surfaces of the passenger suite by the plurality of illumination devices such that the illumination of the one or more surfaces matches or complements the combined illumination characteristics.

2. The system of claim 1, wherein:
   the suite light sensor is configured to detect light intensity entering the passenger suite through a fuselage window of the aircraft cabin; and
   the controller is configured to adjust the amount of light output by the plurality of illumination devices based on the light intensity to compensate for illumination provided via the fuselage window.

3. The system of claim 1, further comprising one or more lighting zones within the passenger suite, wherein:
   each lighting zone of the one or more lighting zones includes one or more individually controllable illumination devices of the plurality of illumination devices; and
   the one or more individually controllable illumination devices for each lighting zone are configured to output light in at least one of a different color and a different intensity of illumination than other zones of the one or more lighting zones.

4. The system of claim 1, wherein the plurality of illumination devices is configured to modulate at least one of light intensity and light color in a predetermined pattern.

5. The system of claim 1, wherein:
   the static element includes an orifice disposed on an upper surface configured to provide a path for light to reach; and
   the suite light sensor is located within a hollowed-out portion of the static element below the orifice.

6. The system of claim 5, wherein the hollowed-out portion is positioned at a distance below the upper surface, wherein the distance is determined based at least in part on average illumination characteristics of one or more external lighting systems detectable by the suite light sensor at the distance.

7. The system of claim 5, wherein the orifice is oriented at an angle from the suite light sensor configured to allows a greatest amount of light from one or more external lighting systems to enter the hollowed-out portion of the static element through the orifice.

8. The system of claim 1, wherein the plurality of illumination devices includes at least two washlights, wherein the at least two washlights are configured to output light in a plurality of coordinated combinations of individual intensities of each of the at least two washlights, wherein the plurality of coordinated combinations is configured to represent a plurality of different colors of light.

9. The system of claim 1, wherein the suite light sensor is configured to sense at least one of infrared, ultraviolet, and near-ultraviolet spectrum light.

10. The system of claim 1, wherein the suite light sensor is configured to send and/or receive visible-light communication.

11. The system of claim 1, further comprising a control panel in communication with the controller, the control panel configured to receive an adjustment setting for the ambient lighting system submitted by a passenger of the passenger suite.

12. The system of claim 1, wherein the controller further includes control circuitry configured to adjust the illumination characteristics output by the plurality of illumination devices based on a sensed passenger status.

13. The system of claim 12, wherein the sensed passenger status is based on at least one of i) one or more motion detectors proximate the passenger suite and ii) one or more pressure sensors disposed in the passenger suite proximate a passenger.

14. The system of claim 1, wherein the suite light sensor includes a RGBW color sensor configured to sense an amount of red, green, blue, and white light.

15. A method for controlling an ambient lighting system within an aircraft passenger suite, the method comprising:

providing a plurality of illumination devices disposed within or proximate the aircraft passenger suite;

receiving, at a controller in communication with the plurality of illumination devices, a plurality of signals from at least one of a) a passenger entertainment computing system, b) a seating control computing system, and c) one or more presence sensors to detect at least one of movement and pressure;

identifying, by processing circuitry of the controller, a change of status of the passenger based on the plurality of signals;

receiving, from a light sensor associated with the passenger suite, signals identifying illumination characteristics of the passenger suite;

monitoring, by the processing circuitry, one or more external light sensors from an external lighting system, wherein the external lighting system comprises at least one of another passenger suite and another lighting zone;

determining, by the processing circuitry, at least one illumination characteristic of the external lighting system by weighting the plurality of other signals based on a relative proximity of each light sensor of the one or more external light sensors to the passenger suite; and adjusting, based on the change of status, at least one of a light color, a light intensity, and a light modulation output by at least a portion of the plurality of illumination devices; and wherein adjusting at least one of the light color, the light intensity, and the light modulation comprises adjusting further in part based upon the signals identifying illumination characteristics of the passenger suite and a plurality of other signals collected from at least one of the one or more external light sensors.

16. The method of claim 15, wherein the change of status represents an activity level of the passenger.

17. The method of claim 15, wherein:

identifying the change of status comprises determining the passenger has moved a passenger seat into a lie-flat position; and adjusting comprises lowering light intensity for sleep conditions.

\* \* \* \* \*